United States Patent [19]

Carboni

[11] Patent Number: 4,616,732
[45] Date of Patent: Oct. 14, 1986

[54] SILENCING SYSTEM FOR EXHAUST GASES FROM INTERNAL COMBUSTION ENGINES

[75] Inventor: Luigi Carboni, Turin, Italy

[73] Assignee: S.I.V. S.p.A., Volvera, Italy; a part interest

[21] Appl. No.: 774,535

[22] Filed: Sep. 10, 1985

[30] Foreign Application Priority Data

Sep. 18, 1984 [IT] Italy ................ 67930 A/84

[51] Int. Cl.⁴ .......... F01N 1/10; F01N 1/14; F01N 7/02
[52] U.S. Cl. ................ 181/232; 181/225; 181/231; 181/243; 181/252; 181/263; 181/272; 181/273; 181/277
[58] Field of Search ......... 181/256, 252, 259, 262, 181/263, 272, 273, 278, 250, 232, 231, 243, 225, 277

[56] References Cited

U.S. PATENT DOCUMENTS

| | | | |
|---|---|---|---|
| 2,834,425 | 5/1958 | Rawson | 181/252 |
| 2,989,138 | 6/1961 | Reese | 181/256 |
| 3,894,610 | 7/1975 | Halter et al. | 181/256 |
| 4,164,266 | 8/1979 | Collin et al. | 181/256 X |
| 4,313,523 | 2/1982 | Copen | 181/263 |
| 4,371,054 | 2/1983 | Wirt | 181/273 X |
| 4,487,290 | 12/1984 | Flaherty | 181/256 |

Primary Examiner—Benjamin R. Fuller
Attorney, Agent, or Firm—Young & Thompson

[57] ABSTRACT

A silencing system for exhaust gases from internal combustion engines, comprising an intermediate silencing device for connection to the exhaust manifold of an internal combustion engine, and a final silencing device series connected to the intermediate silencing device, in which the final silencing device comprises, within an envelope, a number of spaced annular members, intersected by radial partition walls, forming series of chambers of different size, which occupy the peripheral portion of the envelope and open towards the axial portion of this latter, leaving this axial portion substantially free for passage of the flow of exhaust gases, and an idle fan is provided for acting onto the passage for the exhaust gases and onto a passage for additional air, which passages join downstream the fan into an exhaust nosepiece. Some annular members are made of a catalytically active material in order to exert a purifying action on the exhaust gases.

14 Claims, 11 Drawing Figures

SILENCING SYSTEM FOR EXHAUST GASES FROM INTERNAL COMBUSTION ENGINES

BACKGROUND OF THE INVENTION

This invention relates to a silencing system for exhaust gases from internal combustion engines, comprising an intermediate silencing device, a final silencing device and pipings for connecting the inlet of the intermediate silencing device to the exhaust manifold of an internal combustion engine, and the inlet of the final silencing device to the outlet of the intermediate silencing device.

Silencing systems of this kind find a wide application in motor vehicles, because they are generally more effective and easier to be installed than the single-body silencers; however, the known embodiments of these systems have some disadvantages. First of all, the silencing devices being part of the system are usually formed by envelopes containing absorbing materials which, when traversed by the flow of exhaust gases, give rise to noticeable load losses and hence to a considerable back pressure at the exhaust manifold of the engine, which reduces its efficiency. The silencing devices are often effective in attenuating some frequency fields of the exhaust noise of the engine, while they do not sufficiently attenuate other frequency fields. Moreover, whilst usually the intermediate silencing device easily finds a place in the vehicle structure, the final silencing device gives rise to some problems for its installation, especially in small vehicles, owing to the dimensions it should have for being effective. Finally, in the usual embodiments the silencing devices exert no purifying action on the exhaust gases, which are diffused in the ambient more or less silenced but with their full content of contaminant substances, especially carbon monoxyde, sulphur and nitrogen oxides, unburnt hydrocarbons and powdery solid residues.

SUMMARY OF THE INVENTION

The main object of this invention is to improve the silencing systems of the type referred to, especially in order to reduce the back pressure at the exhaust manifold of the engine, to ensure a sufficient attenuation of all frequencies forming the exhaust noise of the engine, and to considerably reduce the overall dimensions of the final silencing device, thus facilitating in a substantial manner its installation in vehicles of any kind whatever. It is a further object of the invention to allow giving to the silencing system, in an economical way, also the ability of exerting a purifying action on the exhaust gases.

This object is attained, according to the invention, mainly in that, in a silencing system of the type referred to, the final silencing device comprises, within an envelope, a number of spaced annular members, intersected by perforated radial partition walls, forming series of chambers which occupy the peripheral portion of the envelope and open towards the axial portion thereof by leaving said axial portion substantially free for passage of the flow of exhaust gases.

Thanks to this characteristic, the pressure waves which, previously partially attenuated by the action of the intermediate silencing device, accompanying the flow of exhaust gases, which on its turn is already somewhat regularized by the intermediate silencing device, are then dispersed within the chambers, which form a kind of acoustical cages at the periphery of the envelope of the final silencing device, and undergo therein a final attenuation by reflection and refraction, whilst the mass of the flow of exhaust gases is allowed to travel through the axial portion of the final silencing device without encountering any substantial resistance. In this way, a considerable reduction of the back pressure exerted by the silencing system at the exhaust manifold of the engine is obtained, whilst a suitable design of the chambers which form the acoustical cages, ordered in groups of different size, allows to extend the actual field of effective attenuation substantially to the whole frequency spectrum contained in the exhaust noise of the engine. It may be ascertained, in practice, that such a device may be effectively designed with very limited dimensions as compared with those of a usual final silencing device. In addition, by using for the annular members and/or the radial partition walls suitable materials, especially copper or copper alloys, capable of exerting a catalytic action on the unburnt substances and the carbon, nitrogen and sulphur oxides, it becomes possible to give to the silencer also effective characteristics of purification of the exhaust gases.

A further reduction of the resistances against the flow can be obtained by supporting said annular members in an elastic manner, thus allowing limited longitudinal displacements thereof, and by installing a ducted fan disposed at the end of the device and acting partly on the flow of exhaust gases and partly on an additional flow of ambient air.

The invention also relates to a particular intermediate device for a silencing system having the above characteristics, which is particularly arranged to allow exploiting in the best way the properties of the final silencing device, though being possible for these two silencing devices to be used individually.

BRIEF DESCRIPTION OF THE DRAWINGS

These and other characteristics and the advantages of the invention will be more clearly apparent from the following description of an embodiment of the invention, given by way of non limiting example and diagrammatically shown in the accompanying drawings, in which.

DETAILED DESCRIPTION OF THE PREFERRED EMBODIMENT

Figure 1:
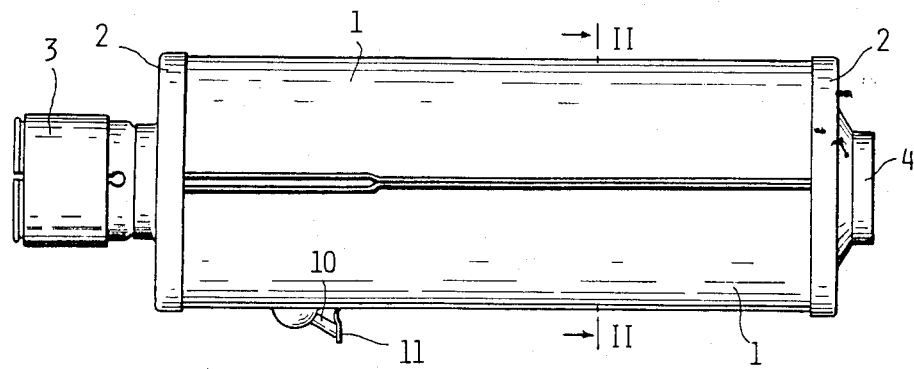
FIG. 1 is an external view, on a reduced scale, of the intermediate silencing device of the system.
Figure 2:
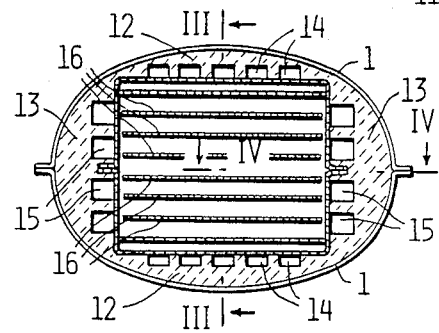
FIG. 2 shows a transversal cross section thereof, taken along line II—II of FIG. 1.
Figure 3:
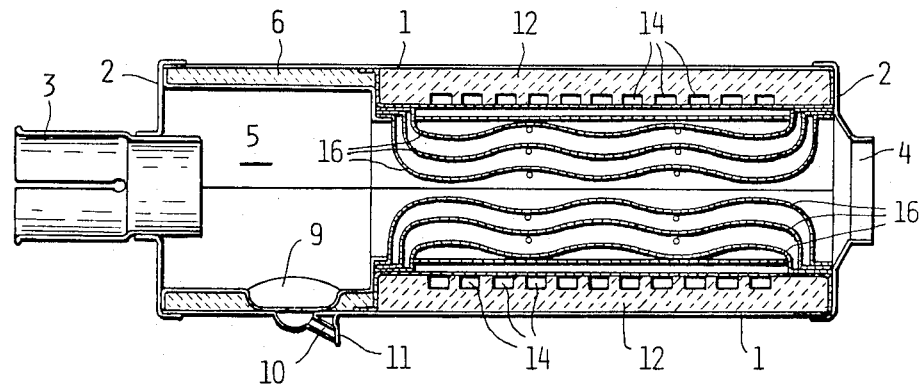
FIG. 3 shows a longitudinal cross section thereof, taken along line III—III of FIG. 2.
Figure 4:
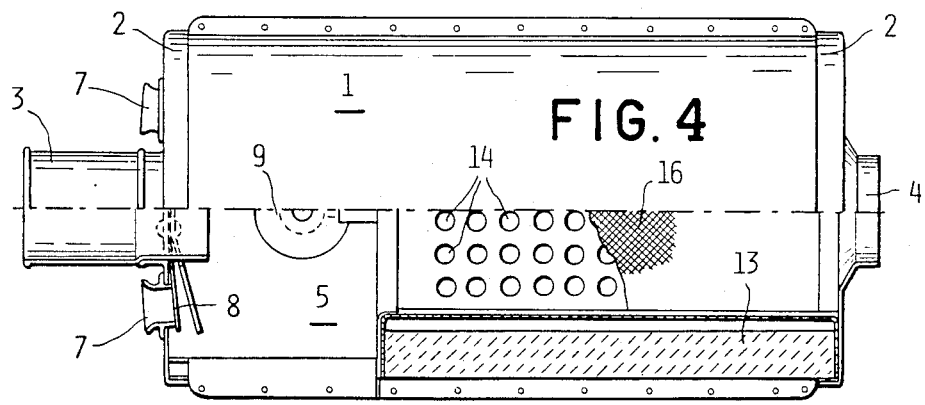
FIG. 4 is a plan view thereof, half sectioned along line IV—IV of FIG. 2, some inner parts being shown interrupted.
Figure 5:
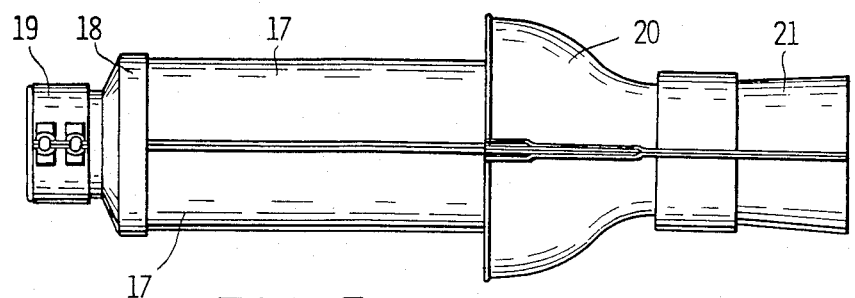
FIG. 5 is an external view, on the same scale as FIG. 1, showing the final silencing device of the system.

Referring now firstly to FIGS. 1 to 4, the intermediate silencing device of the system comprises an envelope formed of two shells 1 defining together an elliptical cylinder closed by two end members 2, one of which supports an inlet union 3 and the other an outlet union 4. The inlet union 3 is intended to be connected, through a piping known per se and not shown, to the exhaust manifold of an internal combustion engine, whilst the outlet union 4 is intended to be connected, through another piping known as well and not shown, to the final silencing device shown in FIGS. 5 to 11.

The inlet union 3 opens into an expansion chamber 5 formed within the envelope 1 and peripherally insulated by a double wall which includes an insulating filler 6. Opening into the chamber 5 are also two air intakes 7 provided with unidirectional blade suction valves 8. Disposed in the bottom of the chamber 5 there is a trap 9 which opens outwards and downwards through an outlet 10 closed by a unidirectional discharge valve 11 formed by a light blade. Housed in the envelope 1 downstream the expansion chamber 5 there is a passage of rectangular cross section which extends up to the outlet union 4 and is defined by walls 12 and 13 made of an insulating thermoacustic material, preferably a mixture of pumice and silica fibers of a type commercially known as siltex. The walls 12 and 13 have in their inner surfaces a number of recesses, 14 and 15 respectively, of different size. The inner surfaces of the walls 12 and 13 are protected by perforated sheet plate or metal nets. Extending in the longitudinal direction in the passage of rectangular cross section defined by the inner surfaces of the walls 12 and 13 there are elastic wave members 16, substantially parallel to each other, formed by perforated plate or metal net.

The operation of this intermediate silencing device is as follows. The pulsating flow of exhaust gases, coming from the exhaust manifold of the engine, flows through the inlet union 3 into the expansion chamber 5 where it expands and establishes an oscillatory pressure condition. During the periods of low pressure of these oscillations, the suction valves 8 allow inlet of cold ambient air. Owing both to the expansion and to this injection of cold air, a rather large part of the steam contained in the exhaust gases condenses, and it captures and incorporates the most part of the transported powdery residues and dissolves a part of the sulphur and nitrogen oxides. The condensed steam collects within the trap 9 and, during the periods of high pressure of the oscillations, it is discharged outwards through the outlet 10 by overcoming the light force of the blade valve 11. The impurities which are discharged in this way under the form of a liquid fall onto the ground and they are not diffused in the ambient. The exhaust gases proceed then beyond the expansion chamber 5, free from quite a large part of the steam and the impurities formerly contained in them, and somewhat increased in volume because of the ambient air sucked through the air intakes 7.

When coming out from the expansion chamber 5, the exhaust gases are accelerated by the reduction of the passage section, and the flow becomes laminar owing to the presence of the waved and perforated members 16. These latter, owing to the action of the pulses applied by the exhaust gases, may elastically fluctuate and thus they are capable of effectively attenuating the higher frequencies of the exhaust noise, though not exerting any excessive braking action on the flow of gases. At the same time, the recesses 14 and 15 formed in the walls 12 and 13 produce an effective attenuation of the lower frequencies of the exhaust noise. Thus, the exhaust gases reach the outlet union 4, and proceed towards the final silencing device, in a condition which is already considerably regularized and with an attenuated noise, and therefore in a condition suitable for receiving an accurate final silencing action. The presence of the waved and perforated members 16 also gives rise to the removal of quite a large part of the transported powders, which collect within the lower portion of the envelope 1.

The final silencing device shown in FIGS. 5 to 11 comprises a cylindrical envelope formed by shells 17 and is closed at one end by an end member 18 supporting an inlet union 19. As already mentioned hereinabove, this union is intended to be connected by a piping to the outlet union 4 of an intermediate silencing device, preferably formed in accordance with FIGS. 1 to 4. At the opposite end the envelope 17 terminates in tapered form within an air intake 20, which on its turn terminates at the rear portion with an exhaust nosepiece 21 which opens in the ambient.

Figure 8:
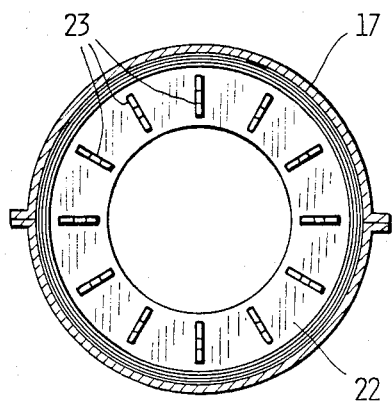
FIGS. 8 to 10 show cross sections taken along lines VIII—VIII, IX—IX and X—X respectively of FIG. 6.
Figure 6:
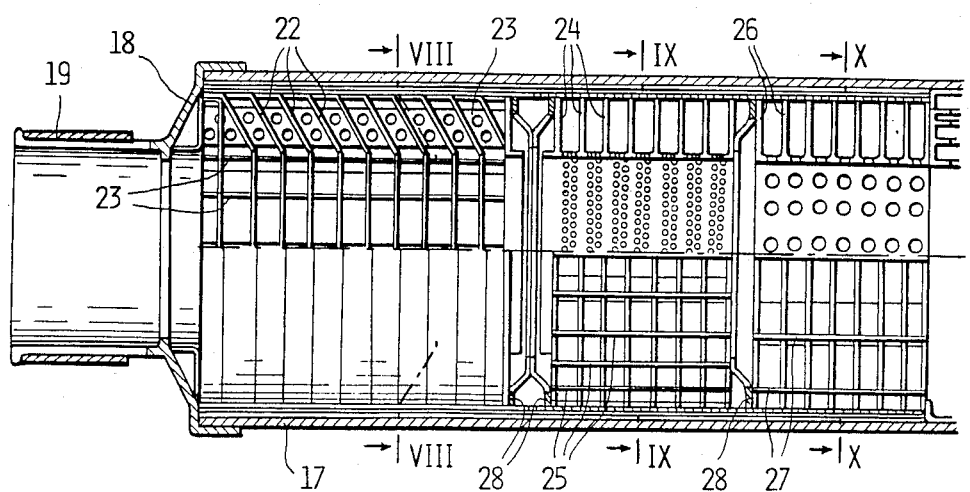
FIGS. 6 and 7 show, on a larger scale, a longitudinal cross section of the front and rear portions, respectively, of the envelope of the final silencing device of FIG. 5, some inner components being shown in a sectional view in the upper half and in an elevational view in the lower half.
Figure 7:
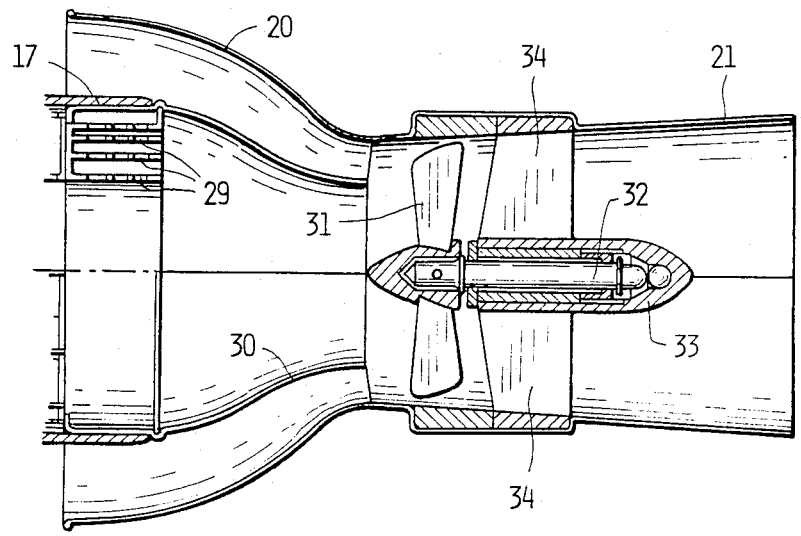

The inner space of the envelope 17 is subdivided in some successive sections. The first section comprises a succession of annular members 22 each having the configuration of a frustum of cone with a peripheral cylindrical collar, said annular members being turned inside with their inclinations consistent with the direction of the flow of exhaust gases, and being intersected by a number of perforated partition walls 23 (FIGS. 6 and 8). These members 22 define a series of annular chambers partially subdivided by the perforated partition walls 23.

Figure 9:
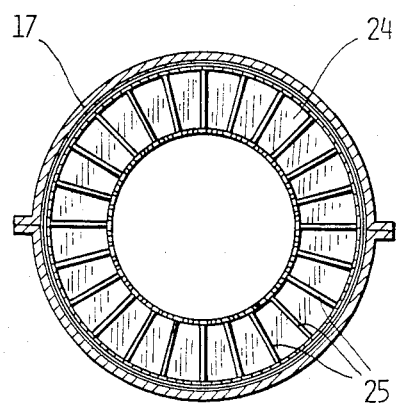
Figure 10:
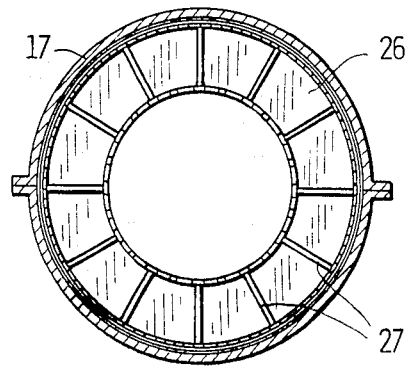
Figure 11:
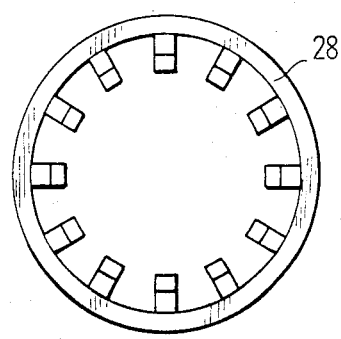
FIG. 11 is a front view of an elastic annular retaining member.

The second section of envelope 17 comprises a succession of plane annular members 24 provided, at their inner periphery, with perforated cylindrical collars, and intersected by a number of partition walls 25 (FIGS. 6 and 9). These members 24 and 25 define a series of sector chambers which open inside through the perforations of the collars of members 24.

The third section of envelope 17 comprises plane annular members 26 and partition walls 27 (FIGS. 6 and 10), substantially similar to those of the second section, from which they differ in the diameter of the perforations, which is larger than that of the perforations of the second section, and in the number of the partition walls 27, which is smaller than that of the partition walls 25, so that the sector chambers formed in the third section are larger than those of the second section and communicate with the inner passage through larger holes. The annular members of the three sections just described are retained in their correct position by elastic annular members 28 (FIGS. 6 and 11), which allow said members some elastic displacements of limited amplitude in the longitudinal direction.

At the described three sections of the final silencing device, the flow of exhaust gases passes, without encountering any appreciable resistance, within the free axial passage defined by the various annular members, but the pressure oscillations forming the sound waves of the noise which still accompanies the flow are dispersed within the acoustical cages formed by the various annular and sector chambers, thus undergoing a strong attenuation due to the repeated reflections, refractions and interferences which arise. At the same time the annular members are capable of elastically yielding, within certain limits, to the pressure waves, thus reducing in a substantial manner the importance of the dissipative phenomena and keeping at the minimum value the resistance opposed against the flow of exhaust gases. Thanks to the different dimensions of the chambers defined by the annular members and by the respective partition walls in the successive sections, as well as to the different dimension of the respective perforations, this system effectively operates on an ample field of frequencies, which may be made to correspond to the whole spectrum of the frequencies which are present in the exhaust noise, thus avoiding the disadvantage of effectively attenuating only some groups of frequencies, as it usually happens with the known devices.

After the third section described hereinabove, the exhaust gases pass through a fourth section (FIG. 7) comprising a group of cylindrical members 29 coaxial with each other and with the envelope 17, perforated and disposed at mutual radial distances which are decreasing from the centre towards the periphery. This fourth section eliminates the noise components which remain from the passage into the preceding sections. Finally, the flow encounters an ogival convergent conduit 30, which directs it towards the central zone of a fan 31 mounted with its own idle shaft 32 in a bearing 33 supported by longitudinal radial tongues 34. These latter are supported by the exhaust nosepiece 21 forming the rear end of the air intake 20 which surrounds in a ring-like manner the envelope 17. The peripheral portion of the fan 31 acts onto the additional air flow passing through said air intake 20.

Since the fan 31 simultaneously operates onto the flow of exhaust gases coming from the conduit 30 and onto the air flow passing through the air intake 20, said fan 31 is moved by the exhaust gases and pushes the additional air flow, thus diluting the exhaust gases prior to their introduction into the atmosphere and creating around them a tubular flow of air which, by partly insulating them from the ambient, facilitates a silent discharge thereof. However, when the system is mounted on a vehicle, and if this latter runs at a noticeable speed, the flow of air within the air intake 20 becomes spontaneously settled by the wind of the movement of the vehicle, and this flow moves the fan 31, which then on its turn pushes the flow of exhaust gases, thus considerably reducing the back pressure exerted at the exhaust manifold of the engine and increasing the efficiency of this latter.

Preferably, some of the inner components of the final silencing device are made of copper, copper alloys or another material having catalytic properties in respect of the unburnt substances and/or the carbon, nitrogen and/or sulphur oxides contained in the exhaust gases. A particular advantage is obtained by using copper in manufacturing those annular members 22 which are situated within the zone in which the exhaust gases have the highest temperature and therefore are more sensitive to the catalytic action. Thanks to these measures, which owing to the configuration of the annular members may be provided in an easy and economical way, it becomes thus possible to give to the silencing system a highly appreciable capacity of exerting a purifying action onto the exhaust gases.

In order to adapt the performances of the system to the requirements of engines of different piston displacement, the silencing devices may be manufactured in various sizes, or else two or more devices may, when necessary, be inserted in parallel. Of course, the specific dimensions of the parts also depend upon the normal operation speed and the number of cylinders of the engine for which the system is intended, these being among the parameters upon which the frequency spectrum of the exhaust gases depends.

The system may be used both for stationary engines and for engines installed on vehicles, and it is especially suitable for these latter in consideration both of the thrust, useful for the propulsion, which is generated by the exhaust gases coming out from the nosepiece 21, and of the suction of the exhaust gases which is operated through the fan 31 by the additional air flow within the air intake 20, which latter function obviously cannot take place in the stationary engines.

I claim:

1. A silencing system for exhaust gases from internal combustion engines, comprising an intermediate silencing device having an inlet for connection to the exhaust manifold of an engine and an outlet, a final silencing device having an inlet for connection to the outlet of said intermediate silencing device and an exhaust outlet, wherein said final silencing device comprises an envelope, a number of spaced annular members arranged in said envelope forming a plurality of successive nonidentical groups, and a number of perforated radial partition walls intersecting said annular members, whereby said annular members and partition walls define successive series of chambers having different characteristics which occupy the peripheral portion of said envelope and open towards the axial portion of said envelope by leaving said axial portion substantially free for passage of the flow of exhaust gases.

2. A silencing system as set forth in claim 1, wherein said intermediate silencing device comprises an expansion chamber having a front end wall and a bottom wall, at least one unidirectional suction valve arranged on said front end wall, and a trap having a discharge opening arranged in said bottom wall.

3. A silencing system as set forth in claim 2, wherein said intermediate silencing device comprises, downstream said expansion chamber, an acoustical attenuation chamber having walls made of a thermoacoustical insulating material, recesses formed in said walls of the attenuation chamber, a passage defined between said walls of the attenuation chamber, and a number of waved and perforated elastic members substantially parallel to each other, extending in a longitudinal direction in said attenuation chamber.

4. A silencing system as set forth in claim 1, wherein at least one group of said annular members is formed by annular members each having the shape of a frustum of cone and having a peripheral cylindrical collar, said conical annular members being disposed with their inclination towards the center consistent with the flow direction of the exhaust gases, and being intersected by said perforated partition walls.

5. A silencing system as set forth in claim 4, wherein said annular members having the shape of a frustum of cone are made of a material, such as particularly copper and copper alloys, adapted to catalyze the combustion of the unburnt substances and/or the carbon, nitrogen and/or sulphur oxides contained in the exhaust gases.

6. A silencing system as set forth in claim 1, wherein at least a group of said annular members is formed by plane annular members each having at its inner periphery a perforated cylindrical collar.

7. A silencing system as set forth in claim 6, wherein said final silencing device comprises at least two groups of plane annular members having perforated inner collars, the annular members of said two groups being intersected by a different number of said partition walls and the respective collars having perforations of different diameters.

8. A silencing system as set forth in claim 1, comprising elastic members cooperating with said spaced annular members and arranged to retain in position said annular members though allowing said annular members limited elastic displacements in a longitudinal direction.

9. A silencing system as set forth in claim 1, wherein said final silencing device further comprises, downstream said spaced annular members and partition walls, a number of coaxial perforated cylindrical members extending longitudinally in the peripheral portion of the envelope and having mutual radial distances which are gradually decreasing from the center towards the periphery.

10. A silencing system as set forth in claim 1, wherein said final silencing device comprises an additional air intake ending in exhaust nosepiece and having an annular passage, and an idle fan having a central portion disposed in register with the passage for the exhaust gases, and a peripheral portion disposed in register with said annular passage of the additional air intake, both said passages joining behind the fan.

11. A silencing system as set forth in claim 10, comprising a convergent ogival portion disposed upstream said fan, and longitudinal radial tongues disposed downstream said fan.

12. A silencing system as set forth in claim 2, wherein said outlet opening of the bottom trap has a light unidirectional discharge valve.

13. A silencing system as set forth in claim 2, wherein said recesses formed in the walls made of an insulating material comprise various groups of recesses of different size.

14. A silencing system as set forth in claims 2, wherein the insulating material of which said walls are made is a mixture of pumice with silica fibres, of a type commercially called siltex.

* * * * *